July 28, 1964    B. GROB    3,142,207
GROOVING METHOD AND APPARATUS
Original Filed Feb. 11, 1954    2 Sheets-Sheet 1

INVENTOR.
BENJAMIN GROB
BY R. M. Lazo
ATTORNEY

United States Patent Office 3,142,207
Patented July 28, 1964

3,142,207
GROOVING METHOD AND APPARATUS
Benjamin Grob, 1626 12th Ave., Grafton, Wis.
Continuation of application Ser. No. 409,597, Feb. 11, 1954. This application Apr. 17, 1962, Ser. No. 188,047
5 Claims. (Cl. 80—16)

This invention relates to an improved groove forming method and apparatus.

In my copending application, Serial No. 409,596, filed February 11, 1954 (now abandoned), I have disclosed an improved method of forming alternate grooves and ribs in the periphery of a cylindrical blank by subjecting the same to the repeated action of planet rollers cyclicly moved into penetrating engagement therewith. In the method and apparatus therein disclosed opposed planet rollers of identical form are employed arranged to operate simultaneously on diametrically opposite sides of the blank, so that the blank penetrating thrusts of each roller are equal to and directly opposed by those of the other, with the result that the position of the blank remains practically undisturbed by the penetrating thrusts of the rollers.

The method of said copending application, Serial No. 409,596, is particularly adapted for the production of an even number of grooves, as well as ribs, in the periphery of a cylindrical blank and it has been successfully used for that purpose. But to produce an uneven number of grooves and ribs in such a blank without subjecting the blank to objectionable unbalanced forces presents a serious problem, because an uneven number of grooves involves an unsymmetrical form wherein each groove is diametrically opposite a rib.

This invention is a continuation of application Serial No. 409,597, entitled "Grooving Method and Apparatus," filed February 11, 1954, by the present inventor and now abanboned.

One object of the present invention is to solve the aforementioned unbalanced force problem. I have accomplished this by the use of opposed planet rollers whose blank penetrating thrusts are directly opposed but in directions laterally offset from the axis of the blank and thus eccentric thereto.

Other more specific objects and advantages will appear, expressed or implied, from the following description of a method exemplifying this invention.

Figure 1:
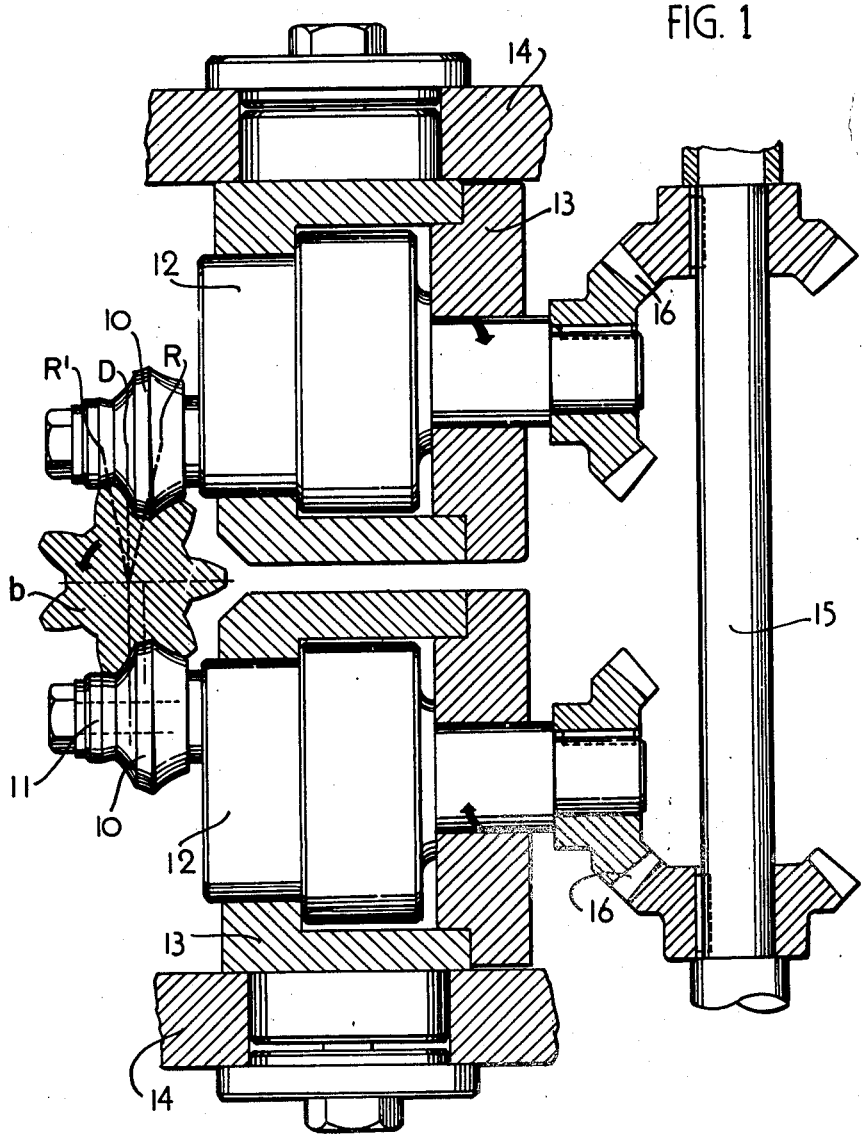
FIGURE 1 is a fragmentary elevational view of one form of apparatus for carrying out the method of this invention.

The apparatus shown in FIGURE 1 comprises a pair of opposed spaced planet rollers 10 of identical form. Each of the rollers is journalled on a rigid stud or crank pin 11 carried by a suitable rotor 12 mounted for rotation in an appropriate stationary head 13 adjustably fixed to a suitable frame member 14 of the apparatus. The arrangement is such that the axis of rotation of each roller is parallel to and radially offset from the axis of rotation of the rotor 12. Both rotors 12 are continuously driven at the same speed and in opposite directions by suitable mechanism, such as a drive shaft 15 and appropriate gearing 16.

In carrying out the method the blank b is slowly advanced lengthwise between the rollers 10 at a predetermined rate, preferably in a direction contra to the orbital movement of the rollers with the rotors 12, so that the rollers simultaneously and repeatedly penetrate opposite sides of the blank along successive overlapping longitudinal portions thereof, and the blank is also slowly rotated about its axis in accurate time relation with the roller movements, so that the repeated penetrating engagements of the rollers therewith occur at predetermined peripherally spaced points on the blank. Several grooves and resultant intermediate ribs are thus formed in the blank by a repetitive roller penetrating action that progresses both longitudinally and peripherally of the blank in much the same manner as disclosed in the above identified pending application. Also, as in said application, the blank penetrating peripheries of both rollers are of identical form and the central plane of action of each is coincident with that of the other, so that the penetrating thrusts applied to the blank by both are equal and directly opposed.

In this instance, however, the blank b is positioned so that the common plane of action of the rollers is eccentric with respect to the blank, being laterally offset from the axis of the blank, the extent of the offset bearing a definite relation to the circular pitch of the ribs ultimately formed on the blank. Also, the blank penetrating peripheral portion of each roller is in this instance unsymmetrical with respect to the plane of rotation thereof, each being shaped to produce a groove which is symmetrical with respect to a blank radius R extending centrally through the groove.

The above noted relation between the rollers and blank may be best understood by reference to that diametric plane D of the blank which extends parallel to the plane of action of the rollers. To obtain the desired results, each roller is so shaped and positioned that the radius R, disposed centrally of the groove formed thereby, is so positioned that the plane D bisects the angle between it and a radius R' disposed centrally of the adjacent rib. In other words, when each roller is fully engaged with the blank, the centers of the engaged groove and adjacent rib are equally spaced on opposite sides of the plane D a distance equal to one quarter of the circular pitch of the ribs ultimately formed on the blank.

It will be understood, of course, that during operation, the blank b is rotated a distance equal to the circular pitch between successive engagements of the rollers therewith, so that each groove, after being subjected to the action of one roller, is later subjected to further action by the other roller, each groove being thus progressively formed by successive actions of both rollers.

Figure 2:
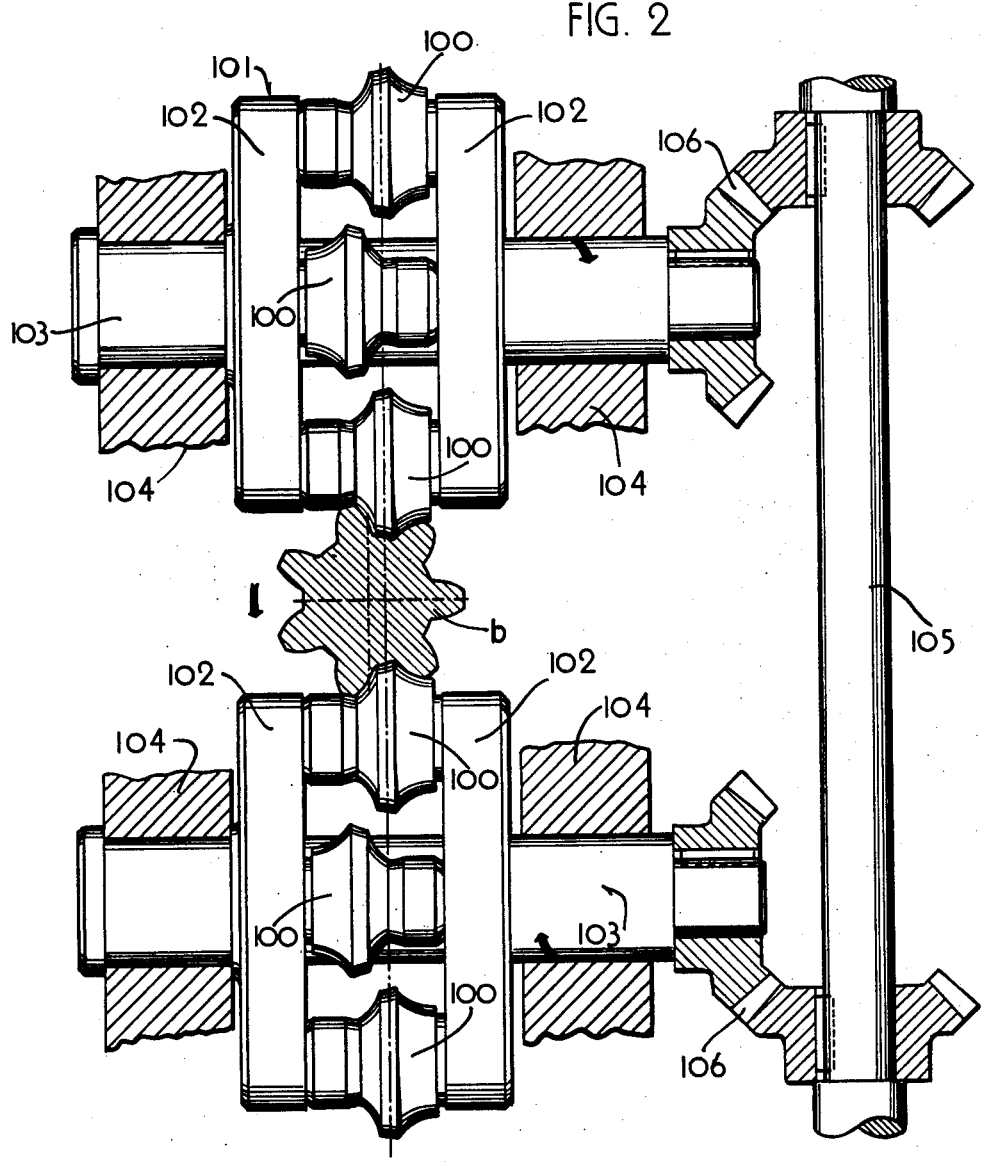
FIGURE 2 is a similar view of another form of apparatus by which the method of this invention may be performed.

A substantially similar method may be performed by the apparatus shown in FIG. 2 in which two opposed sets of planet rollers 100 are provided. In this instance each set of rollers, preferably four equally spaced, are carried by a suitable rotor 101 preferably comprising a pair of laterally spaced disks 102 fixed to a shaft 103 for rotation therewith. The shafts 103 are journalled in appropriate fixed supports 104 and are simultaneously driven in opposite directions by appropriate means, such as a drive shaft 105 and gearing 106.

One pair of rollers of each set are of identical form and operate in a common plane laterally offset from the axis of the blank. The other pair of each set are also of the same form but reversed, and they operate in a common plane laterally offset from the axis of the blank to the same extent but on the opposite side thereof. Those operating in one plane are alternately arranged with respect to those operating in the other plane.

The blank penetrating peripheral portion of each of the rollers is unsymmetrical but designed to produce a groove in the blank having a transverse contour symmetrical with respect to a radius of the blank, the shape and disposition of each roller periphery being determined in the same manner as that hereinabove described in connection with those shown in FIGURE 1.

Each pair of coplanar rollers of one set operate in the same plane as a pair of coplanar rollers of the other set, and the two rotors 101 are so timed that each roller of one set engages the blank simultaneously with one of the rollers of the other set working in the same plane therewith, so that each penetrating thrust applied by each roller of one set is directly and simultaneously opposed by an equal penetrating thrust applied by a roller of the other set.

As in the method above described the blank b is advanced lengthwise between the two sets of rollers and also rotated about its axis. In this instance, however, the blank is rotated through one half a circular pitch between successive engagements thereof by the rollers of each set. That is to say, assuming that the blank as shown in FIGURE 2 is engaged by opposed rollers 100 operating in a common plane at the right side of the blank axis, and assuming that rotation of the blank is in the direction of the arrow, this rotation is such as to cause the blank to turn through one half a circular pitch before being next engaged by a second pair of opposed rollers operating in the other plane at the other side of the blank axis. When thus turned, the upper roller of this second pair engages in that same groove that has just been engaged by the upper roller of the first mentioned pair, and the lower roller of the second pair engages in that groove next adjacent the groove that has just been engaged by the lower roller of the first mentioned pair. This process continues causing the rollers of each set to repeatedly enter each of the grooves previously partially formed and to extend those grooves by the lengthwise advance of the blank and the orbital motion of the several rollers, as above described. In this way an uneven number of grooves and resultant intermediate ribs are formed in the blank by repetitive action of rollers whose blank penetrating thrusts are counterbalanced each by another.

Although in both forms of apparatus shown, the rollers are shaped to produce ribs of gear tooth form, the method is applicable to the production of splines and other rib and groove forms.

Various changes may be made in the method and forms of apparatus hereinabove specifically described without departing from or sacrificing the advantages of the invention as defined in the appended claims.

I claim:

1. In an apparatus for forming an odd number of longitudinally extending alternating grooves and ridges in the periphery of the blank, a forming structure comprising a pair of identical rollers with each roller including an annular surface disposed to initially penetrate the periphery of the blank and form a groove therein, the circle generated by the mid-point of the width of the annular surface of one roller being disposed in a common plane with the circle generated by the mid-point of the width of the annular surface of the other roller, and a line extending normal to said mid-point of the annular surface of one roller intersecting a line extending normal to said mid-point of the annular surface of the other roller and the intersection of said lines being offset from said common plane and coinciding with the center of the blank to be formed.

2. In an apparatus for forming a series of longitudinally extending alternating grooves and ridges in the surface of a cylindrical blank, a forming structure comprising a pair of aligned identical rollers, each roller including a first annular forming surface adapted to form a side wall of the groove in the blank and each roller including a second annular forming surface located adjacent the first surface and adapted to penetrate the periphery of the blank and form the bottom of said groove, each of said rollers also including a third annular forming surface disposed adjacent said second surface and adapted to form a second side wall of the groove, a circle generated by the mid-point of the width of the second annular surface of one roller being disposed in a common plane with the circle generated by the mid-point of the width of the second annular surface of the other roller, and a line extending normal to the mid-point of the width of the second annular surface of one roller being disposed at an acute angle with respect to the axis of that roller and a line extending normal to the mid-point of the width of the second annular surface of the other roller being disposed at an acute angle with respect to the axis of that roller, said lines intersecting at a point offset from said common plane and coinciding generally with the center of the blank to be formed.

3. In an apparatus for forming a series of longitudinally extending alternating grooves and ridges in the surface of a blank, a forming structure comprising a pair of aligned identical rollers, each roller including a first annular forming surface adapted to form a side wall of the groove in the blank and including a second annular forming surface located adjacent said first surface and adapted to form the bottom of the groove, each of said rollers also including a third annular forming surface disposed adjacent said second surface and adapted to form a side wall of the groove, and each of said rollers including a fourth annular forming surface located adjacent said third surface and adapted to form an outer ridge on the blank adjacent the groove, the circle generated by the mid-point of the width of said second surface lying in a plane, and a line normal to the mid-point of the width of said second surface intersecting a line normal to the mid-point of the width of said fourth surface at a point coinciding with the center of said blank and offset from said plane.

4. A method of forming an odd number of elongated grooves in the periphery of a cylindrical blank which comprises the steps of positioning a cylindrical blank between a pair of opposed identical rollers, repeatedly penetrating the periphery of the cylindrical blank by subjecting the same to a series of opposed penetrating thrusts simultaneously applied along a plane parallel to and offset from the axis of the blank by said rollers cyclicly moved into repeated simultaneous engagement therewith, and moving and rotating the blank along and about the axis thereof in timed relation with the cyclic movements of said elements.

5. A method of forming an odd number of alternating ridges and grooves in the peripheral surface of a cylindrical blank, comprising the steps of positioning the cylindrical blank between a pair of aligned identical rollers, simultaneously engaging the surface of the cylindrical blank with the rollers at opposed locations spaced from a plane extending through the axis of the blank and normal to the axis of the rollers a distance equal to one-fourth of the circular pitch of the ridges to be formed on the blank, and moving and rotating the blank along and about the axis thereof in timed relation with the movements of said rollers.

References Cited in the file of this patent

UNITED STATES PATENTS 2,715,846    Grob et al. _____ Aug. 23, 1955

FOREIGN PATENTS 904,998    France _____ Mar. 26, 1945